United States Patent
Rahbar (10) Patent No.: US 8,483,244 B2
(45) Date of Patent: Jul. 9, 2013

(54) TIMING RECOVERY OVER PACKET NETWORKS

(75) Inventor: Kamran Rahbar, Kanata (CA)

(73) Assignee: Microsemi Semiconductor ULC, Kanata, Ontario (CA)

(*) Notice: Subject to any disclaimer, the term of this patent is extended or adjusted under 35 U.S.C. 154(b) by 338 days.

(21) Appl. No.: 12/774,893

(22) Filed: May 6, 2010

(65) Prior Publication Data

US 2010/0296406 A1    Nov. 25, 2010

(30) Foreign Application Priority Data

May 22, 2009    (GB) .................................. 0908884.0

(51) Int. Cl.
*H04J 3/06* (2006.01)
*H04L 7/00* (2006.01)

(52) U.S. Cl.
CPC ............. *H04J 3/0697* (2013.01); *H04L 7/0008* (2013.01)
USPC ........... 370/519; 370/503; 370/516; 375/354; 375/376; 375/371

(58) Field of Classification Search
USPC .. 370/252, 389, 362, 503, 516–519; 375/362, 375/354, 376, 371
See application file for complete search history.

(56) References Cited

U.S. PATENT DOCUMENTS

| 6,658,025 | B2 | 12/2003 | Mauritz et al. |
| 7,315,546 | B2 | 1/2008 | Repko |
| 2002/0186681 | A1* | 12/2002 | Martin .......................... 370/350 |
| 2005/0041692 | A1* | 2/2005 | Kallstenius .................... 370/503 |
| 2006/0013263 | A1 | 1/2006 | Fellman |
| 2006/0039412 | A1* | 2/2006 | Degenhardt et al. .......... 370/516 |
| 2008/0080567 | A1 | 4/2008 | Radulescu |

FOREIGN PATENT DOCUMENTS

| EP | 1432203 A2 | 6/2004 |
| EP | 1785802 A1 | 5/2007 |
| EP | 2023515 A1 | 2/2008 |

OTHER PUBLICATIONS

Paul M. Embree et al. "C++ Algorithms for Digital Signal Processing, Second Edition", Prentice Hall, Nov. 13, 1998.*
Demichelis et al., "RFC 3393, IP Packet Delay Variation Metric for IP Performance Metrics (IPPM)", Network Work Group, Nov. 2002.*

* cited by examiner

*Primary Examiner* — Asad Nawaz
*Assistant Examiner* — Zhaohui Yang
(74) *Attorney, Agent, or Firm* — Marks & Clerk; Richard J. Mitchell (57) ABSTRACT

In a method of recovering timing information over packet networks, raw network delays are measured using timing packets sent between a transmitter and receiver. The expected delay is predicted using a minimum statistics adaptive filter to track local minima of measured time delays over a smoothing window. Only those incoming timing packets which meet a particular criterion relative to the expected delay within a smoothing window are selected, and a local clock is adjusted based on the measured timing delays from the selected timing packets.

16 Claims, 7 Drawing Sheets

TIMING RECOVERY OVER PACKET NETWORKS

FIELD OF THE INVENTION

This invention relates to packet networks, and more particularly to timing recovery over such networks.

BACKGROUND OF THE INVENTION

Synchronization refers to the requirement that the transmit and receive ends of a digital communication networks operate at the same clock rate. A network clock located at the transmitter node controls the rate at which data is transmitted. A second network clock located at receiver controls the rate at which data is read. For the receiver to properly interpret incoming data, its clock needs to be synchronized to the transmitter clock. There are different ways for synchronizing clock over networks. In some network configurations (e.g. TDM networks), transmitter clock information can be extracted directly from data and used in the receiver to synchronize the two clocks. Due to low cost and availability of packet networks, many service providers are looking into transporting legacy services (such as TDM services) over IP based networks. The main problem is how to maintain the same level of synchronization as in legacy network. Although there are different approaches for solving this problem, the one approach that has potentially many advantages over the others (including cost and availability) is clock synchronization using dedicated timing packets.

Figure 1:
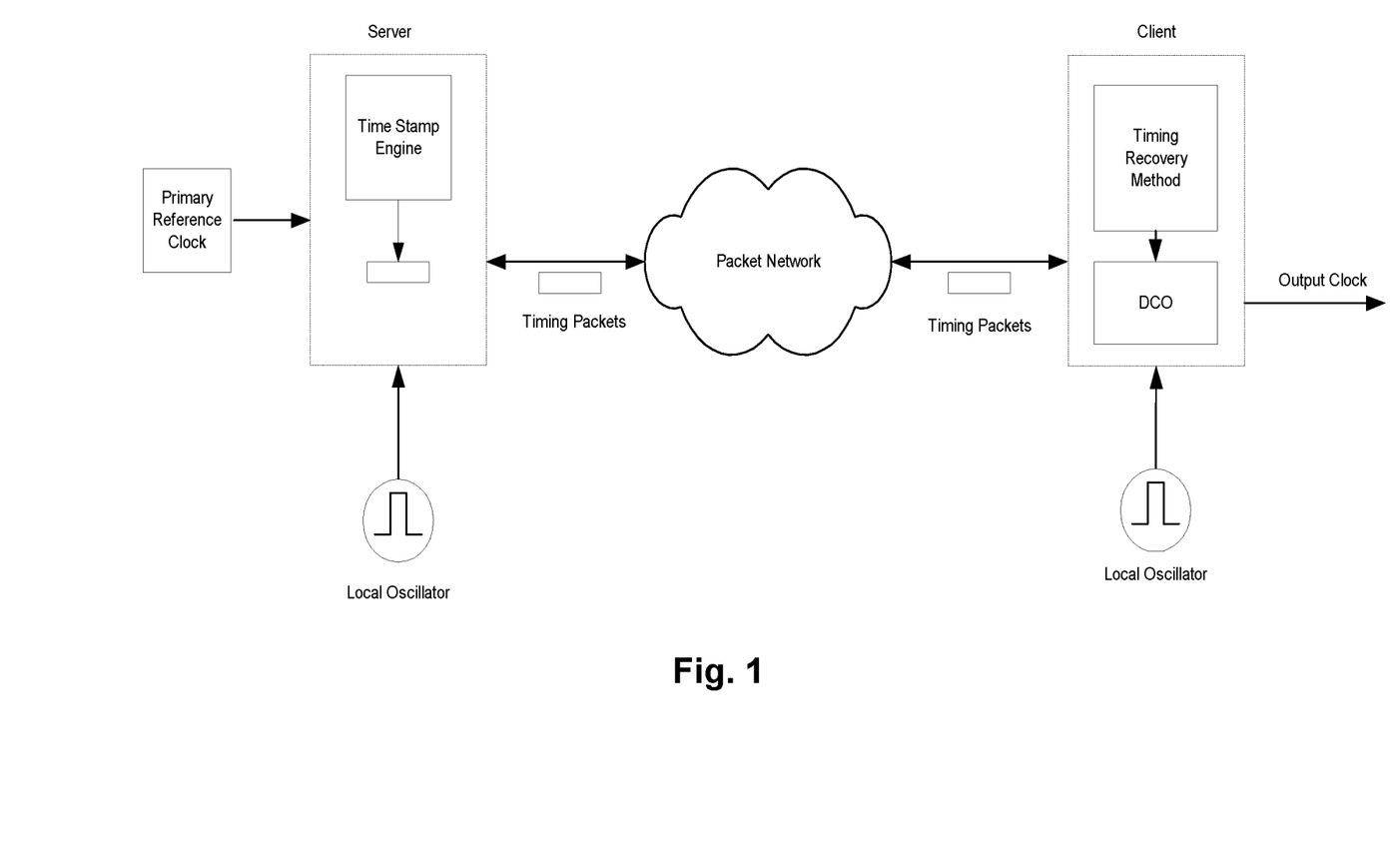
FIG. 1 is a high level diagram of illustrating timing recovery over packet networks.

FIG. 1 is an illustration of this approach. At the transmitter side dedicated timing packets are time-stamped by the transmitter's clock and then sent over the packet switched network (PSN) to one or multiple receivers. At the receiver side these timing packets are time-stamped by the receiver clock as they arrive. The difference between these two time stamps represents the relative delay between the transmitter and receiver's clocks. This can be used to synchronize the two clocks. One advantage of this approach is that it does not require extra means or modifications to the physical layer for synchronizing the clocks, and it is widely available (as long as there is IP network). Nonetheless this approach has its own challenges.

One of the main challenges with this approach is that timing packets are subject to packet delay variations (PDV) inherent to any packet switched networks. As a result at the receiver side, depending on packet delay variations, the recovered reference clock will have a high level of jitter and wander, which will not be acceptable for many applications, especially legacy services that assume high quality level of synchronization.

To overcome this issue, it has been proposed to filtering the timing packets at the receiver such that only those timing packets that are least subjected to packet delay variations are used for clock recovery.

U.S. Pat. No. 6,658,025 describes a method for filtering timing packets where the expected arrival time for each timing packet is estimated and compared to the actual arrival time. Then a number of timing packets with the most deviation from expected value are discarded and the remaining timing packets are used to recalculate a new expected value for arrival time. The new calculated expected value again is used to discard a new series of timing packets and this process continues until certain number of timing packets has been discarded. Whatever timing packets remain after this elimination process are then used to correct any frequency offset between the transmitter and receiver clocks.

Likewise, U.S. Pat. No. 7,315,546 employs a method that, instead of discarding timing packets, uses a weighted set of timing packets to synchronize the receiver and transmitter clocks. Weightings are calculated based on the distance between the expected arrival time and the actual arrival time of the timing packets. In this fashion, the timing packets with the largest distance from the expected delay are given the least amount of weighting.

In both methods timing packets are filtered based on their closeness to some initial estimate of delay between transmitter and receiver. Because of this, the performance of both the above methods depends highly on the accuracy of the calculated expected delay. If due to so-called "outliers", namely packets with large deviations in delay from the norm, the initial estimate is not correct then all subsequent filtering process will be wrong and method will be unable to achieve a lock. Also both methods use blocks of input timing packets to update the expected delay. This will limit the tracking behaviour in the case where there is rapid change of delay between the transmitter and receiver e.g. due to a reroute in the packet network.

SUMMARY OF INVENTION

Embodiments of the invention provide a method for robust frequency and phase synchronization over packet switch networks. A minimum-statistics adaptive filter is used to predict the delay between transmitter and receiver. The predicted delay then is used to select only those timing packets issued at transmitter that will give closest delay estimate to the predicted value. Estimated delays, filtered in this fashion, may then be fed through a phase locked loop to recover transmitter clock.

According to the present invention there is provided a method of recovering timing information over packet networks, comprising measuring raw network delays from timing packets sent between a transmitter and receiver over a packet network; predicting a delay estimate using a minimum statistics adaptive filter to track local minima of measured time delays over a smoothing window of L received timing packets, wherein a first variable represents the local minimum over L received timing packets, said first variable being updated after L received timing packets, and a second variable represents the minimum between the current value for the first variable and the current timing packet within the smoothing window, said second variable representing the current delay estimate, and wherein the value of L is adaptively varied based on estimated delay variations between the transmitter and receiver to change the tracking characteristics of the minimum statistics adaptive filter; selecting those incoming timing packets within the smoothing window which meet a particular criterion relative to the current delay estimate; and making frequency adjustments determined from the measured timing delays of the selected timing packets for a local clock at the receiver.

Advantages of the current approach include robustness to outlier timing packets that affect quality of output clock, programmable tracking ability for different network situations and faster locking time.

The method in accordance with the invention can be considered as an extension of traditional DPLL circuits by the addition of an adaptive time delay filter (ATDF) that adaptively filters out raw time-delay estimates, calculated by subtracting time stamps contained in timing packets generated by transmitter, from receiver time stamps generated locally in receiver.

In one embodiment, the ATDF block comprises a minimum statistics time delay smoothing filter which calculates best estimate of expected time delay between receiver and transmitter for current raw delay estimate. For each subsequent raw delay calculations (done as a new timing packet arrives), the output of adaptive filter will be updated accordingly. The smoothing filter also has a programmable tracking parameter which allows for balancing between faster tracking and less accuracy or slower tracking and more accuracy for estimated delay. The tracking parameter may be set automatically such that at start it will be set to fast tracking mode to allow for fast acquisition of time-delay variations and when locked has achieved it will be set to slow tracking mode to allow for best accuracy.

The difference between raw delay and expected delay may be calculated for each new timing packet. When the difference is below certain threshold that timing packet will be accepted and its corresponding raw delay will be passed on to the next stage.

To convert from a non-uniform sample rate (due to irregular arrival of timing packets) to a uniform sample rate used by later stages re-sampling circuits (RSC) may be used. The remaining stages may consist of a loop filter and a digitally controlled oscillator (DCO), which provides the output clock. The output of DCO is also used to time-stamp arrival time of timing packets.

In another aspect the invention also provides a timing recovery unit for recovering timing information over packet networks, comprising a block for measuring raw network delays from timing packets sent between a transmitter and receiver over a packet network; a minimum statistics adaptive filter to track local minima of measured time delays over a smoothing window to predict a delay estimate over a smoothing window of L received timing packets, and wherein the minimum statistics smoothing filter is configured such that a first variable represents the local minimum over L received timing packets, said first variable being updated after L received timing packets, and a second variable represents the minimum between the current value for the first variable and the current timing packet within the smoothing window, said second variable representing the current delay estimate, and wherein the minimum statistics smoothing filter is configured to adaptively vary the size of smoothing window based on estimated delay variations between the transmitter and receiver to change the tracking characteristics of the minimum statistics adaptive filter; a selection block for selecting those incoming timing packets within the smoothing window which meet a particular criterion relative to the expected delay; and a phase locked loop for outputting a local clock at the receiver using frequency adjustments determined from the measured timing delays of the selected timing packets.

Advantages of embodiments of the invention include a robust and accurate estimate of delay in the presence of outlier timing packets, it does not require a good initial estimate for the expected delay, and it can update the expected delay with each new timing packet arrival rather than using a block of timing packets. This will save significantly in computational complexity and it also will provide better tracking behaviour. Additionally embodiments of the invention are more determinist and provide faster lock times.

BRIEF DESCRIPTION OF THE DRAWINGS

The invention will now be described in more detail, by way of example only, with reference to the accompanying drawings, in which:—

DETAILED DESCRIPTION OF THE PREFERRED EMBODIMENTS

In the following description, k is the index to packet number, x(k) represents the transmitter time stamp for packet k, y(k) represents the output of the digital controlled oscillator (DCO) for packet k, z(k) is the raw delay estimate between the transmitter and receiver for timing packet k, and ω(k) is the filtered raw delay for timing packet k.

Figure 2:
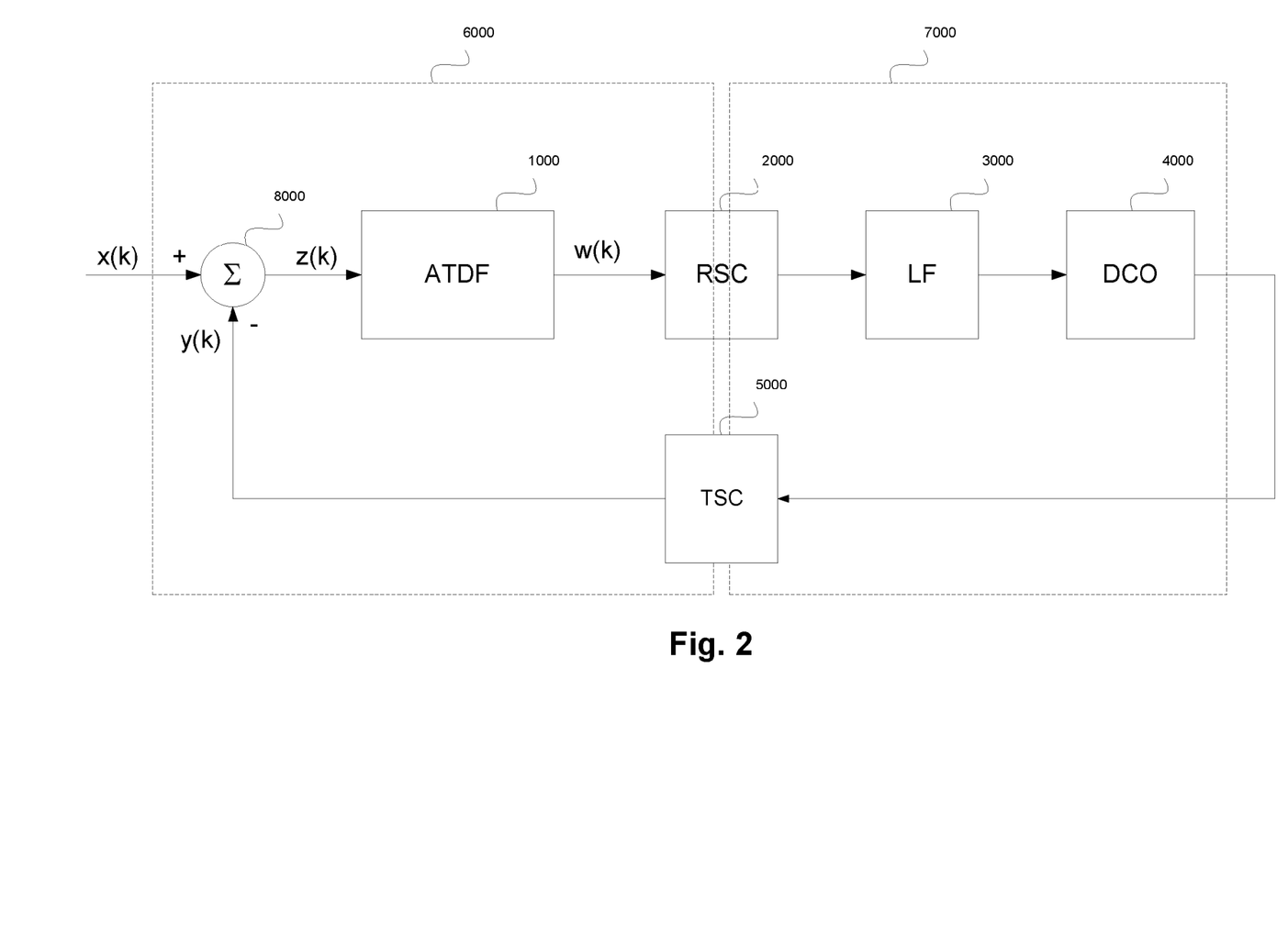
FIG. 2 is a top-level block diagram of an embodiment of the invention.

In a first step, as shown in FIG. 2, raw delays (z(k)) are calculated by subtracting receiver local time stamps (y(k)) generated by time stamp circuit 5000 from corresponding time-stamps (x(k)) generated by the transmitter. The following equation describes the raw timing delays when no timing recovery method has been applied $$z(k) = \phi(k) + \epsilon(k) \quad (1)$$

where $\phi(k)$ represents the true delay between the transmitter and receiver for the $k^{th}$ timing packet and $\epsilon(k)$ represents the error in measurement caused by network packet delay variations for the $k^{th}$ packet. An objective of a timing recovery algorithm is to filter out $\epsilon(k)$ to recover the original delay. It should be noted that $\xi(k)$ as a random nature with non-stationary and in some cases non-Gaussian characteristics. Consequently, traditional linear filtering methods may not be effective.

When the feedback loop is in the steady state (lock mode), the outputs of summer blocks 8000 and 1000 can be written as follows:

$$z(k) = \xi(k) + \delta(k) \quad (2)$$

$$w(k) = \delta(k) + v(k) \quad (3)$$

where $\epsilon(k)$ represents network packet delay variations, $\delta(k)$ represents residual wander on receiver output clock and $v(k)$ represents remaining residual noise at the output of block 1000.

Figure 3:
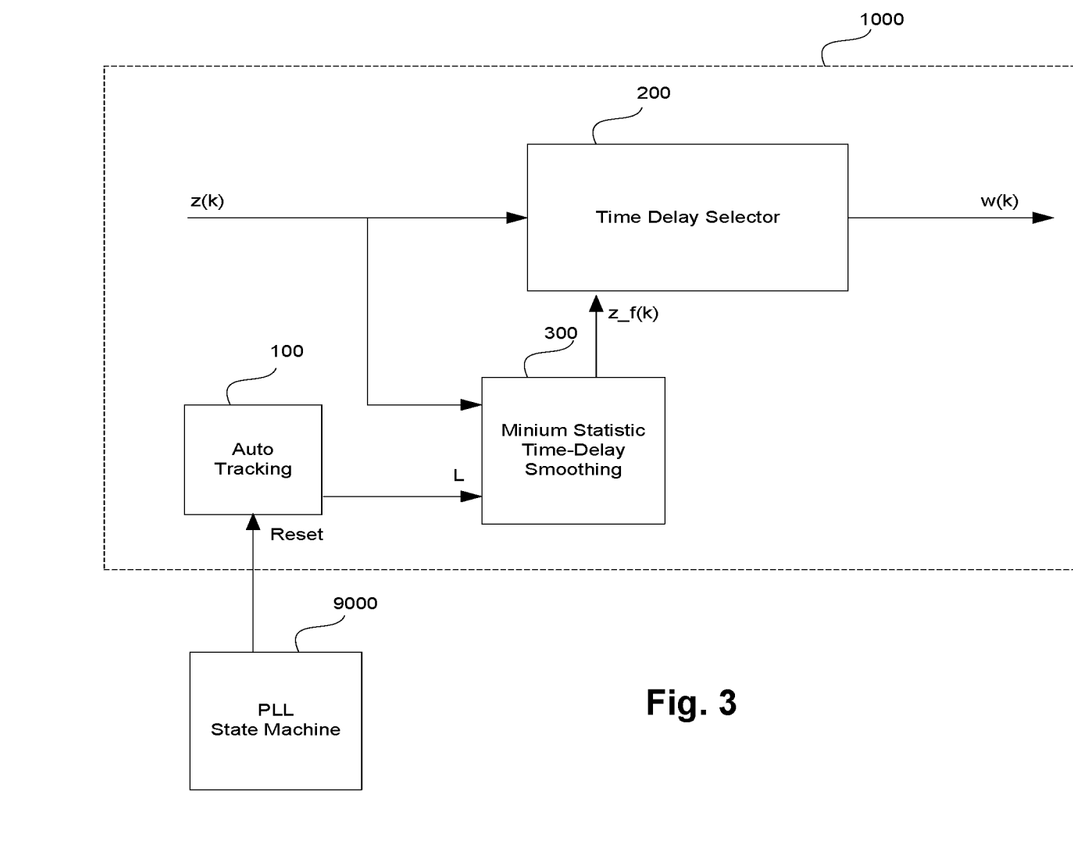
FIG. 3 is an internal block diagram of an adaptive time delay filter (ATDF)

Embodiments of this invention use a non-linear adaptive filtering approach (block 1000) based on minimum statistics to filter out error in time delay estimation between the transmitter and receiver. The non-linear adaptive filter uses a minimum statistics time delay smoothing filter 300 to calculate the expected delay between the transmitter and receiver. This filter tracks the local minima of measured time delays z(k) over a smoothing time window.

To find the estimated delay the local minimum of raw (noisy) delay estimates are tracked. To find the local minimum, a simple option would be to collect L raw delay samples and then find the minimum among all of them. A problem with this approach is that it would be necessary to wait L samples to find the local minimum (which is the delay estimate). This limits the tracking speed.

Rather than waiting for L samples to be collected, wherein L is the length of the smoothing window, it is desirable to update the delay estimate sample by sample, i.e. for each timing packet received. To achieve this, one embodiment of the invention uses two variables z_min and z1_min. z1_min is the local minimum of L raw delays and gets updated after L samples. z1_min, which is the minimum between its current value and current sample, gets updated every sample and provides the output of block 300.

Figure 4:
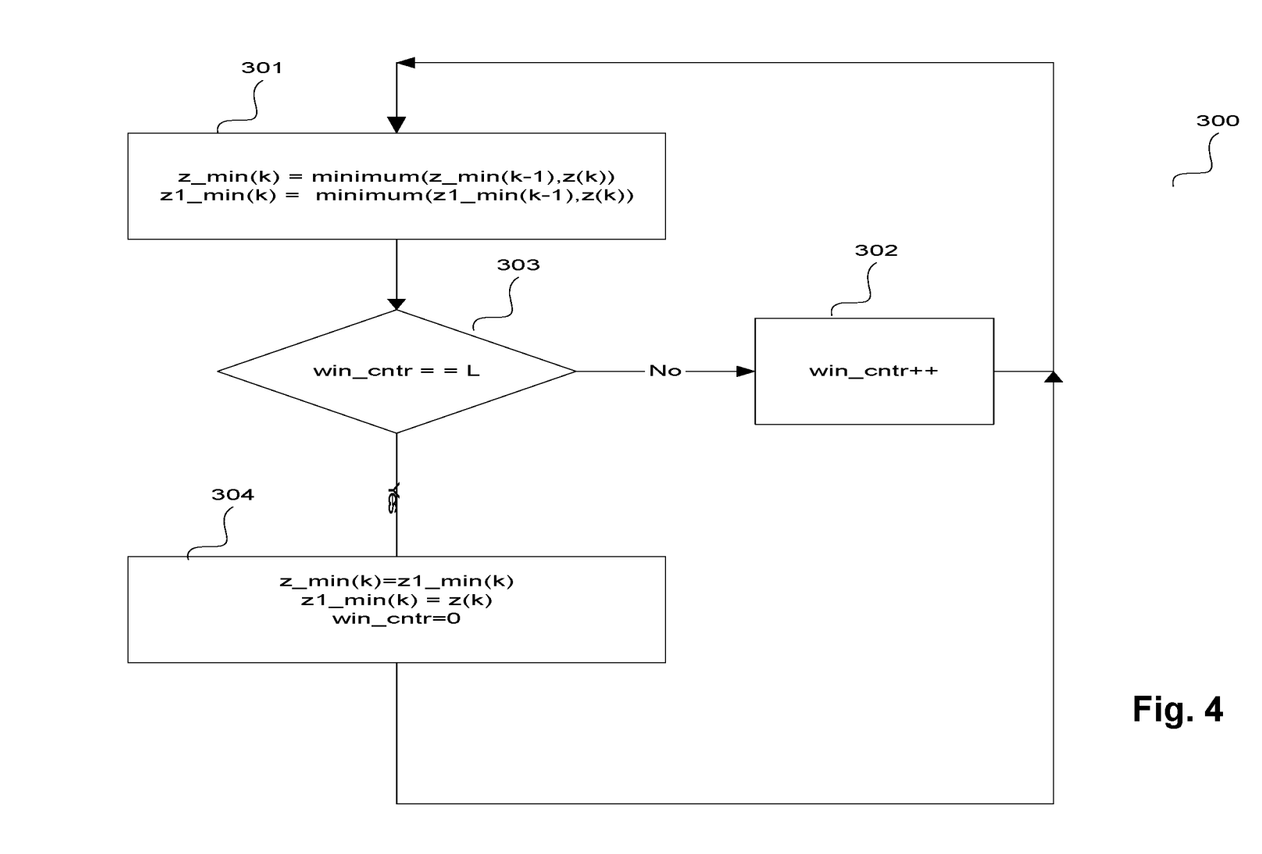
FIG. 4 is flow chart of a time delay smoothing circuit.

To make sure z_min is actually tracking the local minimum and not the global minimum, after each L samples z_min is updated with value of z1_min. With this approach, two things are achieved: first, the local minimum for a particular smoothing window, not the global minimum, is obtained; second, the local minimum is updated every sample rather than waiting for L samples. FIG. 4 shows the flow-chart for the filter block. Win_cntr is a counter value representing the current sample in the smoothing window and is incremented with each sample until L is reached whereupon it is reset to zero.

Block 301 calculates the two local minimas $z_{min}(k)$ and $z1_{min}(k)$ for input raw delays z(k). For every L raw delays, $Z_{min}(k)$ and $z1_{min}(k)$ are updated in block 304. As noted, L is the length of smoothing time window and is set by block 100.

Larger values for L will give more accurate estimate of expected time delay but it will limit tracking the changes of time delay between receiver and transmitter. A smaller value of L will give better tracking at the expense of a less accurate output estimate.

Figure 5:
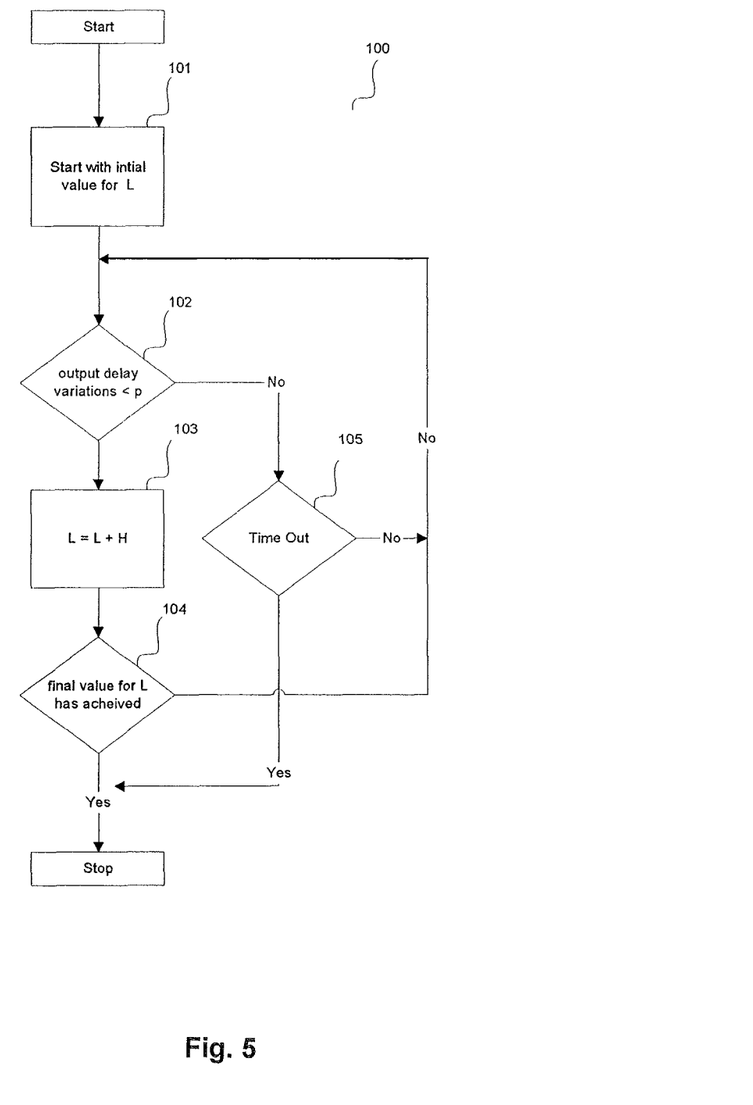
FIG. 5 is a flow chart of an auto tracking circuit.

To achieve faster and more predictable phase lock between transmitter and receiver, block 100 controls the value of L adaptively based on estimated delay variations between transmitter and receiver. FIG. 5 shows the flow chart for block 100.

At start of the locking process when there are large delay variations between transmitter and receiver, L will be set to small values to provide for maximum tracking. Variation in estimated expected delay will be checked by bock 102 and as delay variations decrease, L will be incremented by block 103 to allow for a more accurate estimate of the expected time delay. L will be incremented until its maximum value is reached (block 104). Under normal conditions the maximum allowable value for L will be used to provide for optimum accuracy. When there are sudden changes in delay between transmitter and receiver either due to phase change in transmitter clock or because of a packet network condition (e.g. in the case of a reroute), L will be set to smaller values to allow for faster tracking of the delay change.

Figure 6:
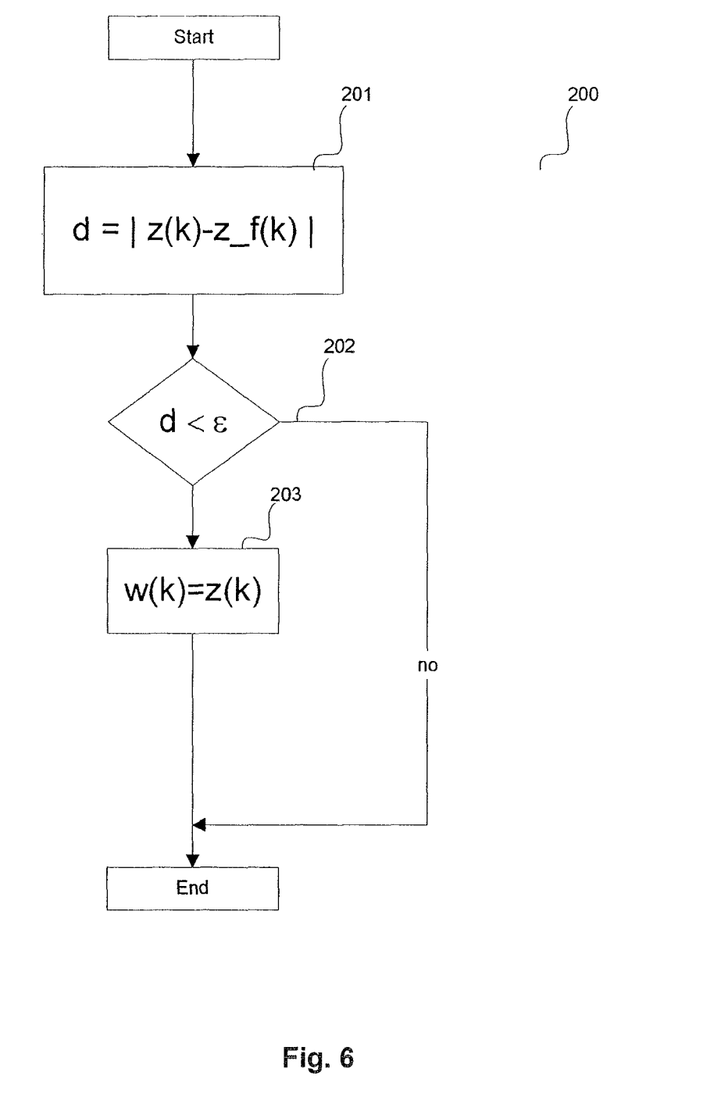
FIG. 6 is a flow chart of a time delay selector block.

Block 200 filters out raw time delay calculated by block 8000 based on expected time delay estimate output of block 300. FIG. 6 is a flowchart for block 200. Block 201 calculates the distance d between the input raw delay z(k) and the expected time delay estimate ($z_e(k)$). Block 202 compares the distance to some threshold. If it is below the threshold, the output will be updated by block 203.

It should be noted that the output of block 1000 can be at much lower rate than its input. For example, if the rate of timing packets arriving at receiver is M packets-per-second, then M raw delays per second will be calculated by block 8000 and will be passed on to block 1000. Depending on the network conditions, only a fraction of these packets might be accepted. In general if $L_{max}$ is the maximum value for L in block 300 then output rate of block 1000 can be as low as $$\frac{M}{L_{max}}$$

updates per second. An additional point to consider is that packets may arrive at non-uniform time intervals. As a result, the output of block 1000 will be updated at non-uniform sample times. In order to convert from non-uniform sample rate to uniform sample rate used by the rest of proposed timing recovery circuit, a re-sampling circuit 2000 is used. This uses a linear interpolation of the output of block 1000 and generates uniformly spaced samples at higher rates (e.g. 16 Hz) required by block 3000.

Block 3000 is the loop filter circuit used in a traditional digital phase locked loop (DPLL). Loop filter converts filtered raw delay estimates to frequency adjustment values for the digital controlled oscillator (DCO) 4000. The loop filter also filters out any remaining residual wander left at the output of block 1000.

Figure 7:
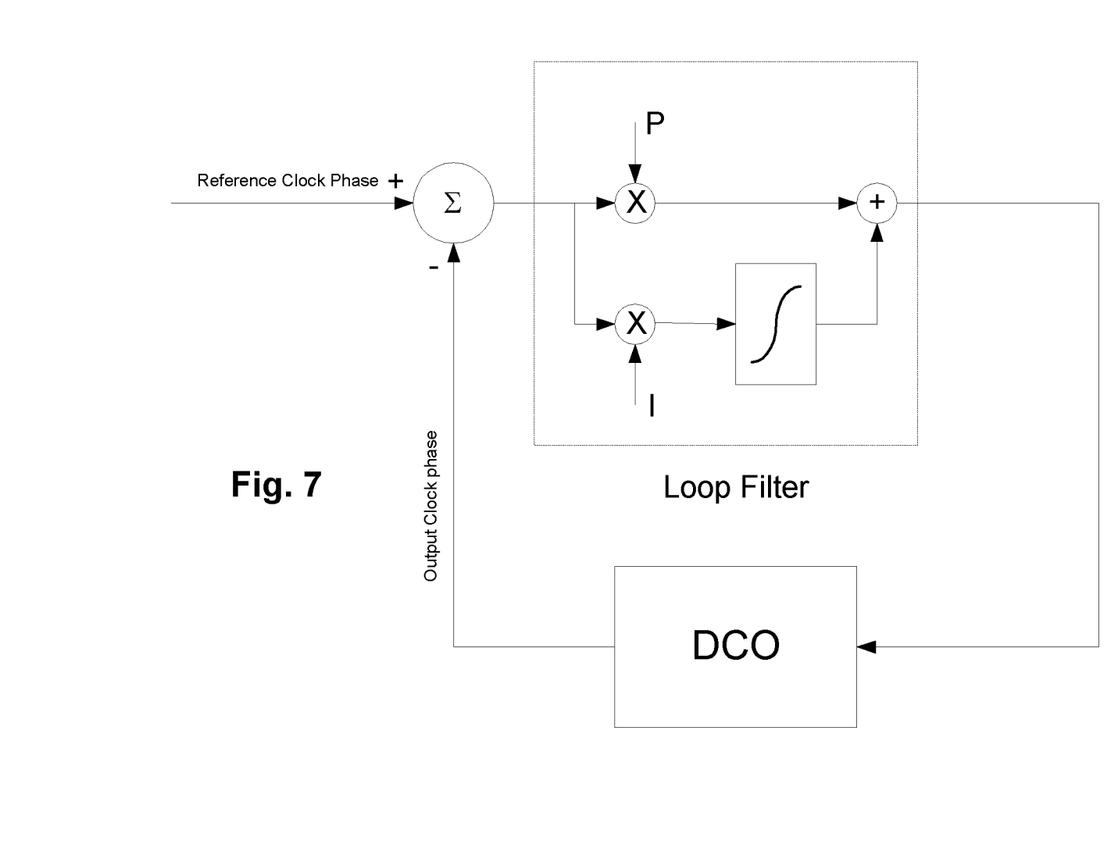
FIG. 7 is an example of loop filter in a traditional digital phase locked loop (DPLL).

The loop filter can be designed for frequency only or phase and frequency synchronization. The loop filter provides an input value for DCO 4000. One suitable implementation of a loop filter is in shown in FIG. 7. In this figure P and I, representing respectively proportional and integrating gains, can be adjusted to control PLL bandwidth and damping characteristics.

For stable operation, the bandwidth of the loop filter should be set in accordance with minimum update rate for output of 100) based on following formula;

$$B.W < M/(2L_{max})$$

for example for M=32 pps and $L_{max}$, loop filter bandwidth should be selected to be less than 15 mHz.

The frequency and phase of the digital controlled oscillator 4000 are adjusted based on its input value. Block 5000 is the time stamp circuit (TSC) for the receiver and constitutes the feedback loop for the proposed timing recover method. For each incoming timing packet, block 5000 will generate a time-stamp value x(k) based on value of DCO at that time.

Advantages of the described embodiments include faster locking time and better tracking ability, especially in the event of sudden delay changes.

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

I claim:

1. A method of recovering timing information over packet networks, comprising:

measuring raw network time delays from timing packets of a single stream sent between a transmitter and a receiver over a packet network;

predicting a current delay estimate using a minimum statistics adaptive filter to track local minima of the measured raw network time delays over a series of successive smoothing windows of L received timing packets of the single stream, by:

maintaining a first variable tracking a local minimum measured raw network time delay within a smoothing window, maintaining a second variable representing the current delay estimate, said second variable being regularly updated within each smoothing window and being set equal to a minimum between the current value thereof and the measured raw network time delay for the current timing packet, after L received timing packets at the start of a new smoothing window setting said second variable equal to the current value of said first variable and subsequently updating the value of said first variable, and adaptively varying the value of L based on estimated delay variations between the transmitter and the receiver to change the tracking characteristics of the minimum statistics adaptive filter;

selecting those incoming timing packets of the single stream within the smoothing window which meet a particular criterion relative to the current delay estimate; and making frequency adjustments determined from the measured raw network time delays of the selected timing packets of the single stream for a local clock at the receiver.

2. A method as claimed in claim 1, wherein the selected incoming timing packets are identified by determining the difference between the measured raw network time delay and the current delay estimate and comparing this difference with a threshold.

3. A method as claimed in claim 1, wherein the second variable is updated for each incoming timing packet within the smoothing window.

4. A method as claimed in claim 1, further comprising resampling the output of the minimum statistics adaptive delay filter to change the sampling rate.

5. A method as claimed in claim 1, wherein the frequency adjustments are filtered in a loop filter of a phase locked loop.

6. A method as claimed in claim 1, wherein the incoming timing packets are timestamped relative to the local clock on arrival and the measured delays are determined by comparing timestamps applied at the transmitter with timestamps applied at the receiver.

7. A method as claimed in claim 1, wherein the first variable is $z1\_min(k)$ and the second variable is $z\_min(k)$, and $z(k)$ is raw delay estimate for timing packet k, and the following loop is implemented:

```
set z_min(k) = minimum (z_min(k−1),z(k))
set z1_min(k) = minimum(z1_min(k−1),z(k))
IF win_cnt = L
    increment win_cntr
ELSE
    set z_min(k) = Z1_min)k)
    z1_min(k) = z(k)
    win_cntr = 0
``` where win_cntr is a counter value and k is an integer.

8. A method as claimed in claim 1, wherein said first variable is updated to the value of the raw measured timing delay of the current packet at the start of said new smoothing window.

9. A timing recovery unit for recovering timing information over packet networks, comprising:
a block for measuring raw network time delays from timing packets of a single stream sent between a transmitter and a receiver over a packet network;
a minimum statistics adaptive filter to track local minima of the measured raw network time delays over a smoothing window to predict a current delay estimate over a series of successive smoothing windows of L received timing packets of the single stream, and wherein the minimum statistics filter is configured to:
maintain a first variable tracking a local minimum raw network time delay within a smoothing window,
maintain a second variable representing the current delay estimate, said second variable being regularly updated within each smoothing window and being set equal to a minimum between the current value thereof and the measured raw network time delay for the current timing packet,
after L received timing packets at the start of a new smoothing window, to set the second variable equal to the current value of the first variable and subsequently update the value of said first variable, and
to adaptively vary the size of smoothing window based on estimated delay variations between the transmitter and the receiver to change the tracking characteristics of the minimum statistics adaptive filter;
a selection block for selecting those incoming timing packets of the single stream within the smoothing window which meet a particular criterion relative to the current delay estimate; and
a phase locked loop for outputting a local clock at the receiver using frequency adjustments determined from the measured raw network time delays of the selected timing packets of the single stream.

10. A timing recovery unit as claimed in claim 9, wherein the selection block determines the difference between the measured raw network time delay of incoming timing packets and the predicted delay and compares this difference with a threshold to select the packets meeting the particular criterion.

11. A timing recovery unit as claimed in claim 9, wherein the second variable is updated for each incoming timing packet within the smoothing window.

12. A timing recovery unit as claimed claim 9, further comprising a resampling unit for resampling the output of the minimum statistics adaptive delay filter.

13. A timing recovery unit as claimed in claim 9, wherein the phase locked loop includes a loop filter that filters the frequency adjustments.

14. A timing recovery unit as claimed in claim 9, further comprising a timestamp block for timestamping the incoming timing packets relative to the local clock on arrival, and a subtraction block for determining the measured delays by subtracting the timestamps applied at the transmitter from the timestamps applied at the receiver.

15. A timing recovery unit as claimed in claim 9, wherein the minimum statistics adaptive filter implements the following loop:

```
set z_min(k) = minimum (z_min(k−1),z(k))
set z1_min(k) = minimum(z1_min(k−1),z(k))
IF win_cnt = L
    increment win_cntr
ELSE
    set z_min(k) = z1_min(k)
    z1_min(k) = z(k)
    win_cntr = 0
``` wherein the first variable is $z1\_min(k)$, the second variable is $z\_min(k)$, win_cntr is a counter value, and k is an integer, and $z(k)$ is raw delay estimate for timing packet k.

16. A timing recovery unit as claimed in claim 9, wherein the minimum statistics adaptive filter is configured to update said first variable to the value of the raw measured timing delay of the current packet at the start of said new smoothing window.

* * * * *